United States Patent [19]
Heitzer et al.

[11] 3,937,624
[45] Feb. 10, 1976

[54] METHOD FOR PRODUCING A GLASS FLOW OF HIGH HOMOGENEITY IN A TANK FURNACE AND AN ARRANGEMENT FOR CARRYING OUT THE METHOD

[75] Inventors: Xaver Heitzer, Porz, near Cologne; Robert Bourggraff, Cologne, both of Germany

[73] Assignee: Erste Deutsche Floatglas GmbH. & Co. OHG, Germany

[22] Filed: Dec. 5, 1974

[21] Appl. No.: 529,845

[30] Foreign Application Priority Data
Dec. 17, 1973 Germany............................ 2362565

[52] U.S. Cl. ..................... 65/135; 65/136; 65/337; 65/347; 65/346
[51] Int. Cl.² .......................................... C03B 5/26
[58] Field of Search ............. 65/134, 135, 136, 346, 65/347, 337, 338

[56] References Cited
UNITED STATES PATENTS
1,595,861  8/1926  Diederichs...................... 65/337 X
1,639,466  8/1927  Reece.............................. 65/135 X
1,872,477  8/1932  Mambourg...................... 65/135 X Primary Examiner—Arthur D. Kellogg
Attorney, Agent, or Firm—Price, Heneveld, Huizenga & Cooper

[57] ABSTRACT

The specification describes a method for producing a glass flow of high homogeneity in a tank furnace in which a selected layer of refined glass underneath the surface layers and above the bottom layers is drawn off at a point spaced from the end wall of the tank towards which the glass flows and is supplied to the processing station. The surface layers and the glass layers lying underneath the selected layer are returned into the refining section of the tank at a point upstream from the point of removal of the selected layer. Recirculation of the surface layer is encouraged by proper location of surface heating means and/or cooling means in the refining section in the tank.

20 Claims, 6 Drawing Figures

METHOD FOR PRODUCING A GLASS FLOW OF HIGH HOMOGENEITY IN A TANK FURNACE AND AN ARRANGEMENT FOR CARRYING OUT THE METHOD

BACKGROUND OF INVENTION

1. Field to which invention relates

The present invention relates to glass refining.

2. The prior art

It is known that the surface layer in a glass tank differs in respect of its chemical composition from the layers lying underneath it. The change in the chemical composition is due to the fact that some components of the glass react with the furnace atmosphere and/or evaporate and escape. As a rule therefore the surface layer has a higher silicic acid content. Sometimes also bubbles and/or foam may be produced. These surface layers can lead to difficulties in processing the glass to produce the finished product, and to more or less pronounced streaks in the finished product. In order to avoid these consequences, the prior art method provides for separating the surface layer of the fused glass from the main flow and the separated surface layer is then diverted and removed from the prehearth of the fusing tank. Such a method is described in the German Patent specification (Offenlegungsschrift) 2,106,061.

For certain purposes particularly high requirements are raised as regards the homogeneity of the glass which comes to be processed and these requirements cannot be satisfied with the prior art method. This is always the case when glass articles or products are to be produced with a high optical quality, for example a transparent glass strip with plane parallel surfaces. It is just in the case of such glass strips, which are produced today in accordance with the drawing method or in accordance with the float method, that such division up into layers and streak formation can lead to a disadvantageous effect in the glass. However, also in the case of the production of other articles as for example the production of articles of glass compositions with a high melting point, of colored glass, in the case of the production of hollow glasses etc. the homogenization of the glass melt can present a substantial problem so that in this case as well there is also a requirement for a method with which it is possible to produce extremely homogeneous glass melts.

SUMMARY OF INVENTION

Accordingly one object of the present invention is to provide a method and an arrangement suitable for carrying out a glass flow separation with high physical and chemical homogeneity.

In order to achieve these and other objects according to the invention, a selected layer of glass melt in the refining section of the tank, underneath the surface layers and above the bottom layers, is drawn off at a point spaced from the end wall of the tank towards which glass flows and supplied to the processing station, while the surface layers and the glass layers lying underneath the selected layer are returned, rather than being removed, into the refining section at a point lying upstream from the point of removal of the selected layer.

The invention makes use of the known fact that within a glass tank certain flows or currents of the glass exist in the longitudinal and transverse direction and that, looked at in the vertical direction, a layer sequence of glass respectivley having the same history and with high physical and chemical homogeneity exists. On the basis of knowledge of these factors the invention provides for deliberate interference in this flow and layer make up within a glass tank for the removal of only selected flow zones or parts for supply to the processing station.

The return of the lower layers is generally not critical. Particular measures do not generally have to be undertaken in this respect, because the natural flow conditions adjacent to the bottom of the melt furnace involve a natural return flow.

The elimination and return of the surface layer, on the other hand, can be ensured by particular channels or ducts for example, which run to the side of the working part of the fusing or melting tank. However, it is advantageous if the return of the surface layers is carried out also within the working part of the tank itself using natural return flow, present as a matter of course, within the surface layer and running adjacent to the side walls of the working part. In this respect this natural return flow can be supported, for example by increasing the temperature gradient in the surface layer adjacent to the end wall between the middle zone of the glass melt and the zones adjacent to the side walls. For this purpose it is possible for example to heat the surface layer in the center and/or cool it adjacent to the side walls. This acceleration of the surface flow favors the maintenance of the natural flow equilibrium and helps to ensure that no parts of the surface layer pass into the glass flow which is to be removed.

In any case it is important for the surface layer above the position of removal to be able to flow on without hindrance to a point downstream from the point of removal where it is then deflected or diverted and is returned as a whole into the melting furnace at a point upstream from the position of removal.

The position of removal for the selected layer of glass to be processed must be at a sufficient distance from the downstream end wall of the glass tank, that the glass flows substantially in the direction of the longitudinal flow axis of the melting tank and that the glass flows or currents are not yet diverted or deflected and not yet mixed.

The glass flow selected and removed in the deliberate manner described can in accordance with a first embodiment of the method be passed on in the direction of the longitudinal axis of the melting tank and can be passed through a channel, passing through the end wall of the melting tank, to the processing station. In accordance with another embodiment the glass flow removed can be supplied in a vertical direction through a channel or duct, passing through the bottom of the melting tank, to the processing station.

An arrangement suitable for carrying out the method is characterized chiefly by a channel or duct opening in the end section of the refining section of the tank and leading out of the melting tank, for the further passage of the molten glass to the processing station or point. The inlet cross-section of the duct opening in its vertical extent is substantially less than the vertical extent of the glass bath at this position and the entry cross-section is arranged underneath the surface layers of the glass melt to be eliminated and at a horizontal distance from the rear end wall of the glass melting tank.

BRIEF DESCRIPTION OF THE DRAWINGS

Further details of the invention will be gathered from the patent claims and from the following description of various embodiments referring to the accompanying drawings.

DESCRIPTION OF PREFERRED EMBODIMENTS

Figure 1:
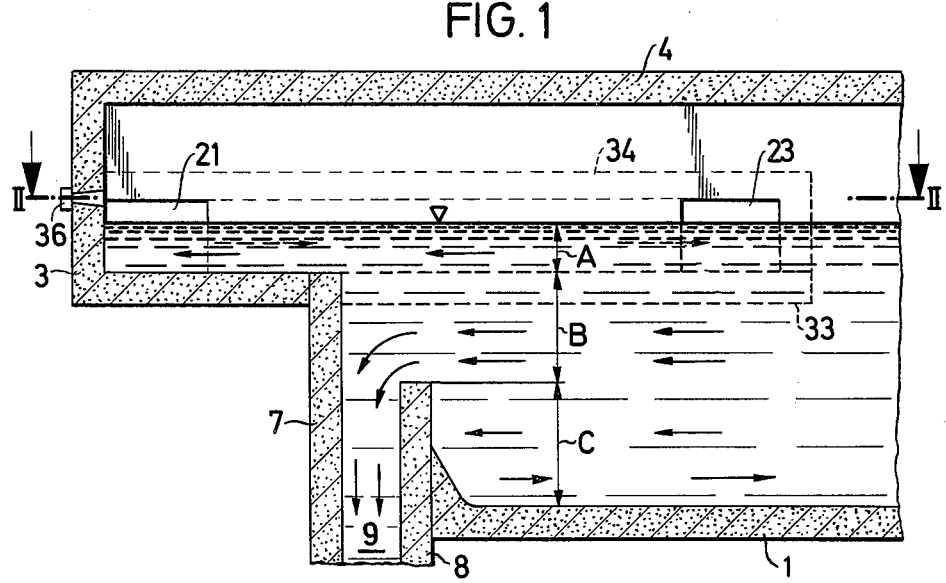
FIG. 1 shows a vertical section through an embodiment of the part, in accordance with the invention, of a melting tank with vertical passing on of the glass flow removed and with lateral channels or ducts for the return of the surface layers.
Figure 2:
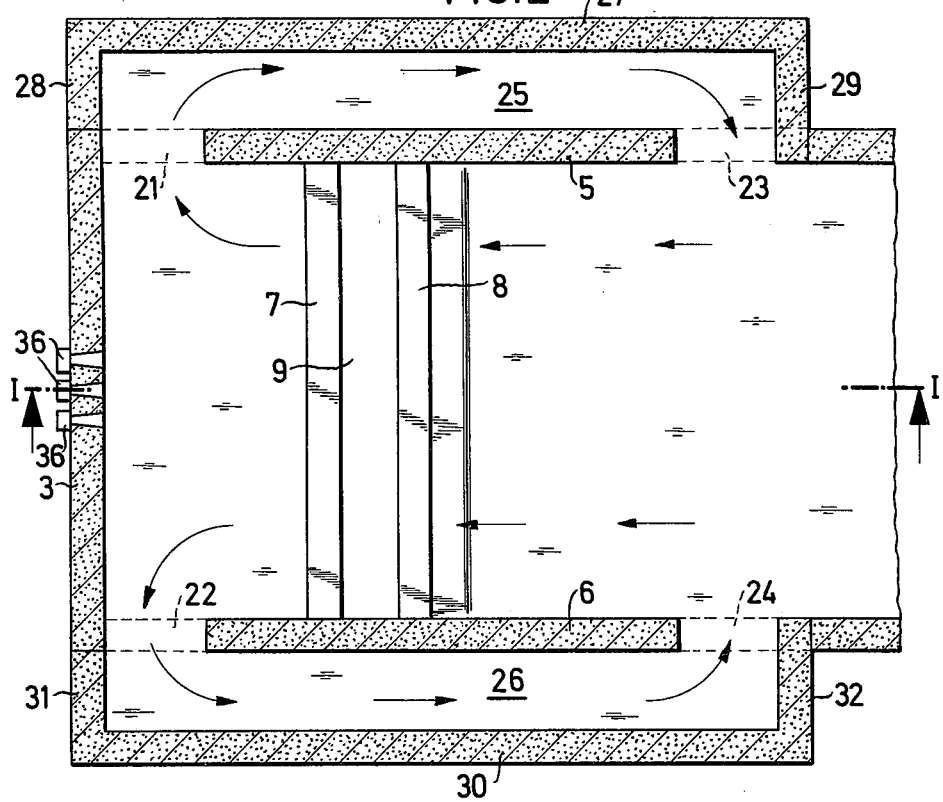
FIG. 2 shows a horizontal longitudinal section through the melting tank, shown in FIG. 1, along the line II—II.

The embodiment of the invention shown in the FIGS. 1 and 2 comprises the rear end of the working part of the melting tank, including the bottom 1, the end wall 3, the cover 4, and the side walls 5 and 6.

Two vertical walls, 7 and 8 are arranged at a spacing of the order of magnitude of 1 to 5 meters from the end wall 3, which spacing can vary within wide limits in accordance with the particular size of the melting tank, to define a vertical duct or channel 9, underneath the level of the glass and extending over the whole breadth of the working part of the refining tank. The vertical wall 7 extends further upwards than the wall 8. Wall 7, looked at in the direction of flow of glass in the tank, is placed further back so that a sufficient entry cross section for the glass to be passed on to the processing station is formed. Normally the surface layers at a depth of a few centimeters to, approximately, 10 centimeters, comprise the interferring non-homogeneous zones. Accordingly the wall 7 extends from the bottom of the working part of the tank to a height of approximately 20 to 5 centimeters underneath the surface level of the glass melt.

As a result, as can be seen from FIG. 1, the glass melt is divided up as it were into three superimposed zones A, B, C. The zone A corresponds to the surface layer which is to be eliminated. The zone B constitutes that selected layer of the glass melt which is passed by the duct 9 onto the processing point. The zone C comprises the layers adjacent to the bottom, in which the glass melt substantially flows back to the front of the refining tank.

As can be seen from FIG. 2, the side walls 5 and 6 adjacent to the end wall 3 respectively have openings 21 and 22 and further back each have an opening 23 and 24, respectively. The openings constitute the entry openings and, respectively, the outlet openings for the ducts 25 and 26 resepctively, which ducts run parallel to the side walls 5 and 6. They are formed by the walls 27 and 30, respectively, and by the side walls 28, 29 and, respectively, 31, 32, and also by the bottom 33 and the cover 34. These lateral ducts 25 and 26 serve for returning the surface layer of the glass into a zone upstream from the vertical duct 9. The flows in the surface zone A assume in this respect the course indicated by the arrows in FIG. 2. In the zones B and C the flows on the other hand run approximately as is indicated in FIG. 1 with the help of the arrows.

In the end wall 3 above the glass level and in the central part of the working part of the refining tank several burners 36 are provided. They serve to heat the surface layer glass melt in this zone and therefore favor the flow of the glass to the openings 21 and 22.

Figure 3:
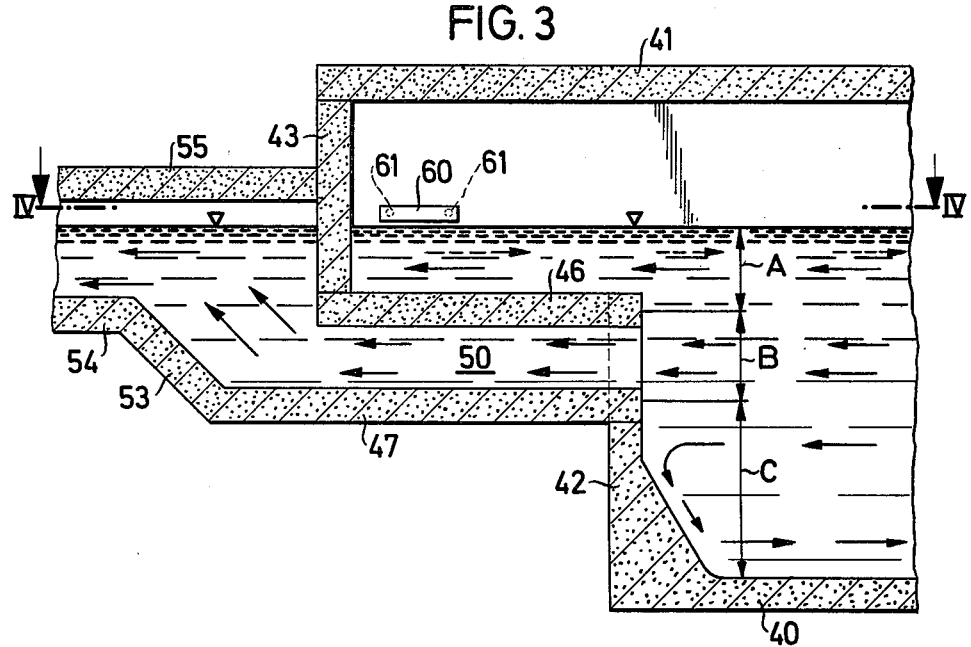
FIG. 3 shows another embodiment of a melting tank with the features of the invention in a vertical longitudinal section.
Figure 4:
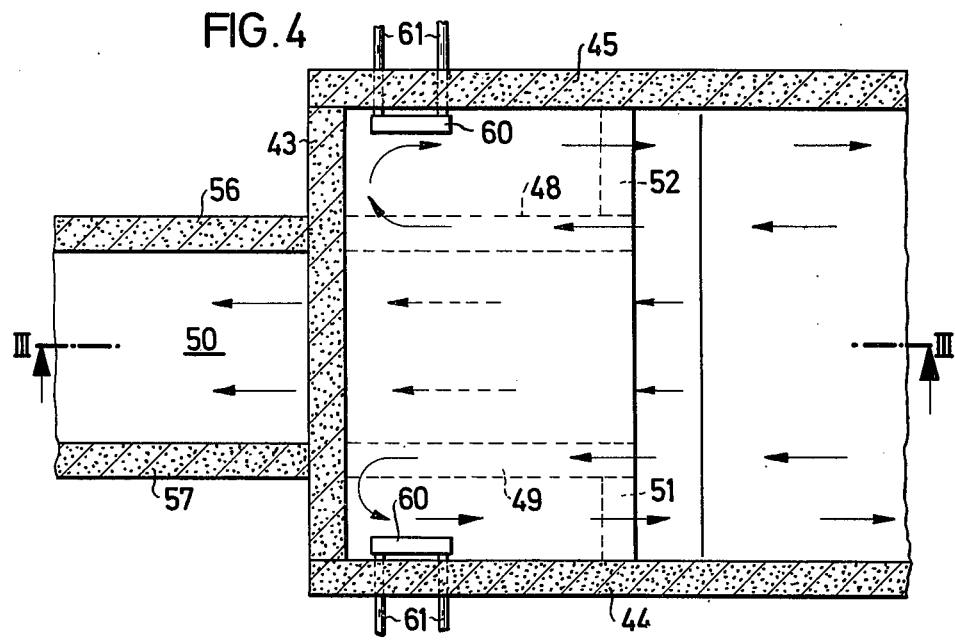
FIG. 4 shows a horizontal section along the line IV—IV through the melting tank, shown in FIG. 3.

In the case of the embodiment shown in FIGS. 3 and 4 the working part of the melt furnace comprises the bottom 40, the cover 41, the end walls 42 and 43 and the side walls 44 and 45. The end portion of the working part of the tank is constructed in a stepped manner, in which the lower part 42 of the end wall is set back with respect to the upper part 43 by a distance in the order of magnitude of 1 to 5 meters. The intermediate bottom 46 connects the two parts 42 and 43 of the end wall with each other. It is arranged underneath the surface layers to be eliminated. Above this intermediate bottom 46 the forwardly flowing surface layers are deflected and flow back again along the side walls 44 and 45 without entering the passage duct 50 for glass flowing to the processing station.

Underneath the intermediate bottom 46 are a bottom 47 and side walls 48, 49 which define closed duct 50. Duct 50 conducts the glass layers intended for further processing. In height it covers approximately the glass layers of the zone B. Owing to the side walls 48, 49 and the connecting walls 51, 52 adjoining at the level of the opening of the duct, the layers of the zone B are not removed for the whole breadth of the working part but only in its center part. This removed glass is passed on into the duct continuing beyond the end wall 43. Beyond end wall 43, duct 50 is formed by the bottom parts 53, 54, the cover 55, and the side walls 56, 57, and it passes on the fused glass directly to the processing station which is not shown, which may be, for example, an arrangement for making float glass.

The arrows drawn again indicate the direction of flow of the glass in the various zones. In the upper part A the surface layers of the glass flow again over the flow in cross-section of the duct, and in accordance with their natural tendency they are laterally diverted adjacent to the end wall 43 and then flow back again. This natural return flow is favored by the arrangement of coolers 60, which are arranged above the glass level along the side walls 44, 45 adjacent to the side wall 43, and which have cooling water flowing through them which is supplied through the tube 61.

Figure 5:
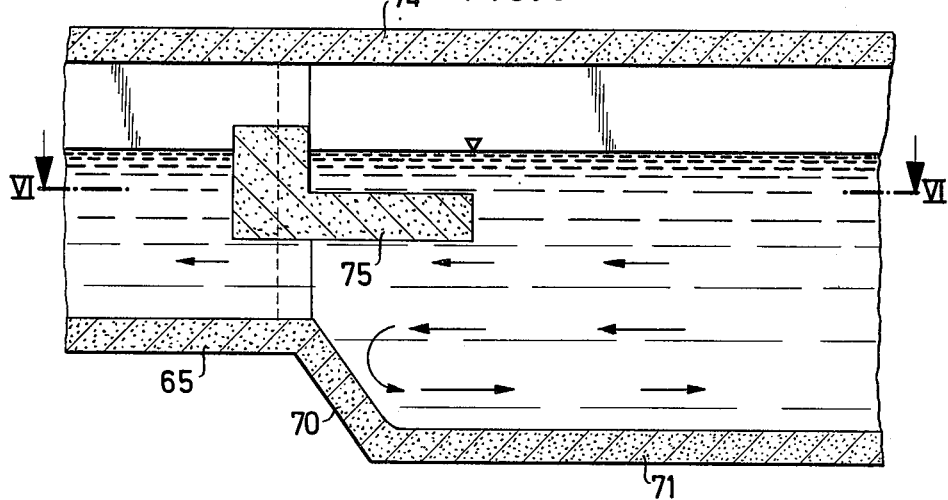
FIG. 5 shows a further embodiment which is suitable for subsequent adaptation of a pre-existing melting tank.
Figure 6:
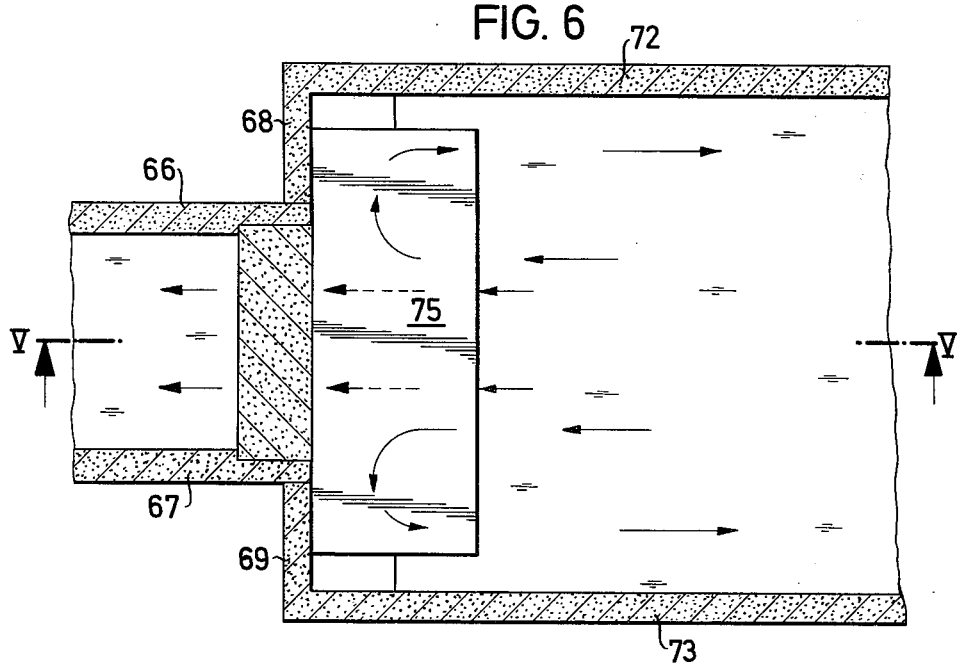
FIG. 6 shows a horizontal section along the line VI—VI of FIG. 5.

In the FIGS. 5 and 6, an embodiment is shown, which is suitable for subsequent adaptation of pre-existing melt tanks. A condition is that a channel adjoins the working part of the melting tank for the passing on of the molten glass. This channel or duct is formed by the bottom 65 and the side walls 66 and 67. It adjoins the side wall 68, 69 and 70 of the working part of the melt tank. The melt tank is formed by the bottom 71 and by the end walls 72 and 73. The upper termination of the melt tank and of the channel or duct is formed by the cover 74.

At the position where the cross-section is reduced, that is to say adjacent to the transition between the working part of the fusing tank and the duct, an L-shaped block 75 is so arranged that its vertical limb extends out about the glass surface, while its horizontal limb is directed towards the melt tank and lies underneath the glass surface. It plunges so deeply into the glass melt that the surface layer to be eliminated is located above this limb. Its length is suitably dimensioned to enable the surface glass layer above this horizontal limb to be deflected and returned.

The vertical limb of the L-shaped block 75 extends over the whole breadth of the channel or duct and is preferably borne in the side walls 66, 67. The horizontal limb of the L-shaped block 75 is broader than the duct or channel. The L-shaped block 75 forms with the bottom 65 and the side walls 66, 67 of the channel the glass removal cross-section.

The embodiments of the invention in which an exclusive property or privilege is claimed are defined as follows:

1. A method for producing a glass flow of high homogeneity in a tank furnace in which the surface layer of the glass melt is separated from the glass flow intended for processing, characterized in that within the working part of the tank, which contains the refined glass, at a removal point spaced upstream from the downstream end wall of the tank, a selected layer of glass underneath the surface layers and above the bottom layers is drawn off, at least in part, and supplied to the processing station, while said surface layers above said selected layer are allowed to pass on downstream beyond said removal point and are returned from a point in the tank downstream of said removal point to a point upstream from said removal point, said bottom layers below said selected layer also being returned to a point upstream from said removal point.

2. A method in accordance with claim 1, characterized in that said surface layers are diverted towards the sides of the tank at a point downstream of said removal point and are returned to the front of the tank where flow is initiated.

3. A method in accordance with claim 2, characterized in that the return of the surface layers of the molten glass is carried out by means of ducts running adjacent to the side walls of the working part of the melt tank.

4. A method in accordance with claim 3, characterized in that adjacent to said downstream end wall of the working part of the melt tank means are provided for effecting a temperature gradient, running from the center of the tank to the side walls thereof.

5. A method in accordance with claim 4, characterized in that the removal of the selected glass layer is carried out at such a distance from said downstream end wall of the working part of the melt furnace that at said removal point, the glass flows substantially in the direction of the longitudinal flow axis of the melting tank and mixing of the glass flows has not yet taken place.

6. A method in accordance with claim 5, characterized in that the selected layer glass flow removed is passed on in the direction of the longitudinal axis of the melt tank through a duct, passing through said downstream end wall of the melt tank, to the processing station.

7. A method in accordance with claim 5, characterized in that the selected layer glass flow removed is passed in a vertical direction through a duct passing through the bottom of the melt tank to the processing station.

8. A method in accordance with claim 2, characterized in that the return of the surface layers of the molten glass is carried out within the working part of the melt tank itself using natural return flow along the side walls of the working part.

9. A method in accordance with claim 8, characterized in that adjacent to said downstream end wall of the working part of the melt tank means are provided for effecting a temperature gradient, running from the center of the tank to the side walls thereof.

10. A method in accordance with claim 1, characterized in that adjacent to said downstream end wall of the working part of the melt tank means are provided for effecting a temperature gradient, running from the center of the tank to the side walls thereof.

11. A method in accordance with claim 1, characterized in that the removal of the selected glass layer is carried out at such a distance from said downstream end wall of the working part of the melt furnace that at said removal point, the glass flows substantially in the direction of the longitudinal flow axis of the melting tank and mixing of the glass flows has not yet taken place.

12. A method in accordance with claim 1, characterized in that said downstream selected layer glass flow removed is passed on in the direction of the longitudinal axis of the melt tank through a duct, passing through the end wall of the melt tank, to the processing station.

13. A method in accordance with claim 1, characterized in that selected layer glass flow removed is passed in a vertical direction through a duct passing through the bottom of the melt tank to the processing station.

14. A glass melt tank for effecting the selected separation of a layer of molten glass located intermediate the top and bottom surface layers of the melt tank, said melt tank comprising: an upstream end away from which glass is intended to flow and a downstream end towards which glass is intended to flow; an upper end wall at said downstream end, against which the upper layers of glass flow as they flow downstream in said tank; a pair of spaced side walls and a bottom; a removal duct leading out of the melt tank for conducting the flow of molten glass to a processing station, said removal duct leading out of the melt tank for conducting the flow of molten glass to a processing station, said removal duct including an opening into said tank whose cross-section in its vertical extent is substantially less than the vertical extent of the normal glass bath level for the tank and whose cross-section is arranged underneath the surface layers of the glass melt to be eliminated and above the bottom layers of the glass melt to be eliminated; and said removal duct opening into said tank being spaced at a horizontal distance upstream from said upper end wall of the glass melting tank such that the surface layer glass currents in the tank run substantially in the longitudinal flow direction of the melting tank as they pass over said opening of said duct.

15. A melt tank in accordance with claim 14 characterized in that a return duct is provided adjacent each of said side walls and to the outside of said tank, each of said side walls including a downstream opening at the downstream end of said tank adjacent said upper end wall and downstream from said removal duct opening which opens into said return duct and an upstream opening at the upstream end of said tank which opens from said return duct into said tank whereby the flow of glass is from the upstream end of said tank to the downstream end thereof, through the downstream opening in the sidewalls thereof, through the return ducts and back into the tank at the upstream openings from said return ducts into said tank.

16. The melting tank in accordance with claim 14 characterized in that said duct for conducting the flow of selected glass to the processing station is arranged horizontally underneath the surface layer of molten glass to be separated and includes an upper wall defining a bottom for the surface layers of glass which are to be diverted.

17. The melting tank in accordance with claim 14 characterized in that said removal duct for conducting the flow of selected glass to a processing station is defined in part by a block of a generally L-shaped cross-section, the vertical limb of said block projecting above the intended surface level for glass in the tank and said horizontal limb projecting towards the upstream end of said tank at a level just underneath the intended bottom level for the upper surface layers of glass to be separated.

18. The melt tank of claim 14 which includes heating means positioned on said upper end wall thereof at a point above the intended surface level for the glass in said tank and being located generally centrally of said upper end wall whereby the flow of surface layers of glass in the tank from the center of the upper end wall thereof towards the side walls thereof is encouraged.

19. The melting tank according to claim 14 characterized in that cooling means are positioned on each of said side walls of said tank generally adjacent said upper end wall of said tank whereby the flow of glass in the upper surface layers of glass in said tank from the center of said upper end wall towards said side walls of said tank is encouraged.

20. The melting tank according to claim 14 characterized in that said removal duct extends generally vertically from said removal duct opening out through said bottom of said tank.

* * * * *